United States Patent [19]
Feistkorn et al.

[11] Patent Number: 5,384,080
[45] Date of Patent: * Jan. 24, 1995

[54] METHOD AND APPARATUS FOR THE REDUCTION OF THE SAG AND/OR OF THE VARYING STRESS PROFILE OF A FLATTENED TUBULAR FILM WEB PRODUCED BY A BLOWN FILM PROCESS

[75] Inventors: Werner Feistkorn, Saerbeck; Klaus-Peter Voss, Lengerich, both of Germany

[73] Assignee: Windmöller & Hölscher, Lengerich, Germany

[ * ] Notice: The portion of the term of this patent subsequent to Dec. 24, 2009 has been disclaimed.

[21] Appl. No.: 709,319

[22] Filed: Jun. 3, 1991

[30] Foreign Application Priority Data

Jun. 6, 1990 [DE] Germany .............. 4018150
Jul. 31, 1990 [DE] Germany .............. 4024326

[51] Int. Cl.⁶ .............................................. B29C 47/92
[52] U.S. Cl. ................... 264/40.6; 264/40.7; 264/289.6; 264/342 RE; 264/567; 425/140; 425/144; 425/326.1
[58] Field of Search .............. 264/40.6, 40.7, 40.5, 264/342 RE, 289.6, 567; 425/140, 172, 144, 326.1

[56] References Cited

U.S. PATENT DOCUMENTS

| | | | |
|---|---|---|---|
| 3,347,960 | 10/1967 | Fenley | 264/40.6 |
| 3,544,676 | 12/1970 | Spencer | 264/342 RE |
| 3,632,726 | 1/1972 | Knox et al. | 264/342 RE |
| 3,700,370 | 10/1972 | Hearns et al. | 425/140 |
| 4,189,288 | 2/1980 | Halter | 425/140 |
| 4,246,212 | 1/1981 | Upmeier et al. | 264/40.6 |
| 4,277,594 | 7/1981 | Matthews et al. | 264/564 |
| 4,325,897 | 4/1982 | Zerle et al. | 425/140 |
| 4,436,888 | 3/1984 | Copple | 264/289.6 |

FOREIGN PATENT DOCUMENTS

| | | |
|---|---|---|
| 107819 | 5/1984 | European Pat. Off. . |
| 1804471 | 3/1969 | Germany . |
| 2146266 | 6/1973 | Germany . |
| 2365843 | 6/1976 | Germany . |

*Primary Examiner*—Jeffery Thurlow
*Attorney, Agent, or Firm*—Keck, Mahin & Cate

[57] ABSTRACT

The invention refers to a method for the reduction of the sag and/or of the different stress profile of a flattened tubular film web produced by a blown film process and made of thermo-plastic synthetic resin, transversely to its longitudinal direction. For the solution of the problem to provide a method according to which the sag and/or the different states of tension transversely to the tubular film web can be easily reduced or eliminated to a maximum degree, the tubular film web is heated along its width and then cooled and/or stretched. Furthermore, the invention refers to an apparatus for carrying out the method.

11 Claims, 1 Drawing Sheet

METHOD AND APPARATUS FOR THE REDUCTION OF THE SAG AND/OR OF THE VARYING STRESS PROFILE OF A FLATTENED TUBULAR FILM WEB PRODUCED BY A BLOWN FILM PROCESS

BACKGROUND OF THE INVENTION

1. Field of the Invention

This invention refers to a method for the reduction of the sag and/or of the varying stress profile of a flattened tubular film web produced by a blown film process and made of thermo-plastic synthetic resin, transversely to its longitudinal direction.

2. Description of Prior Art

During their production, after the inflation to form a tubular film bubble, tubular films are drawn thereoff by a pair of pinch rolls which are preceded by flattening plates extending wedge-shaped to each other, which converge in direction towards the roll gap of the pair of pinch rolls. A result of this kind of flattening of the tubular film web drawn off from the tubular film bubble is that the laterally folded edge sections of the tubular film web directly pass into the roll gap of the pair of pinch rolls, whereas the web portions lying between the folded edge sections of the web slide over the inner sides of the flattening plates with an unavoidable friction and, starting from opposite sleeve lines of the film web, are progressively pressed in a flat form in which then the wall parts of the web, lying flat on top of each other, pass through the draw-off roll gap. The result of this kind of flattening of the tubular film web drawn off the tubular film bubble is that in the flat state the center parts of the web portions lying one on top of the other have been stretched in a longitudinal direction to a larger degree than the folded edge sections which without a previous sliding on the flattening plates have directly passed into the roll gap of the pair of draw-off rolls. By said different stretching of the web portions of the tubular film web, lying on top of each other, with respect to the edge section the web has a certain sag in its center section, which becomes visible when the flattened web is observed which is loosely supported in a horizontal plane. The sag can also be observed when the flattened tubular film web is separated along its width into longitudinal strips of identical width, and weights of identical size are hanged onto the individual longitudinal strips. Due to the different lengths of the web sections, the weights then show the form of a curved line.

Due to this different stretching of the tubular film web along its cross-section during its production, different tensions in the web are obtained transversely to its longitudinal direction.

If such a tubular film web were e.g. to be cut along its center line, the two half tubular webs would be deflected to the outside, since the tension at the outside is larger than the one in the center section, due to which the half tubular webs would show a curved form. Such curvings of webs, however, are undesirable with a view to the further processing. If such webs were to be printed in printing machines, decisive difficulties would arise, since the register and the corner mark (format lengths) could not be exactly met.

SUMMARY OF THE INVENTION

It is the object of the invention to provide a method of the kind mentioned hereinbefore according to which the sag and/or the different states of tension transversely to the tubular film web can be easily reduced or eliminated to a maximum degree.

According to the invention this problem is solved in that the tubular film web is heated along its width and then cooled and/or stretched.

According to the inventive method, the heating and subsequent cooling as well as stretching basically have different effects so that they can be carried out individually or simultaneously or in a combination with each other.

By the heating of the web, possibly up to the range of the crystallisation temperature, a recrystallisation or relaxation is obtained which, corresponding to the respective state of tension transversely across the web, can be of a different degree. If subsequently the tubular film web relaxed in this manner by heating is cooled down, there is a fixation of the molecules orientated by the relaxation or the recrystallisation, which results in a reduction of the sag and an evening out of the different states of tension. The cooling of the web leads to a thermofixation so that after passing the treatment path the tubular film web has at least a reduced sag and tensions being evened out over its diameter.

By stretching the web, an orientation of the molecules across the width of the web is obtained, which begins at the edge sections and decreases to the inside, by which first of all the undesired sag can be reduced.

The heating as well as the subsequent thermofixation by cooling as well as just a stretching of the web lead to a reduction of the sag or an evening out of the different tensions across the width of the web. Particularly favourable results can be obtained when the web is heated and simultaneously stretched and subsequently thermofixed in the described manner by cooling.

According to the invention, an apparatus for carrying out the method according to the invention consists of at least two laterally staggered rolls arranged in planes being parallel to each other, wherein at least the first one is heatable and the last one is coolable, the web being led in a zigzag form over the rolls in form of oppositely open loops following each other. Advantageously four rolls are provided in a roll frame, of which the first two ones are heatable and the last two ones are coolable.

For permitting the stretching of the web, in a further development of the invention there is provided that the rolls are drivable at different speeds such that at least a downstream roll rotates at a higher speed than the upstream one. If the web is only to be stretched, the rolls arranged in a zigzag form are only stretching rolls which cannot be heated and cooled. If the method according to the invention is to be carried out in a combined form, the first rolls rotating at different speeds are heated, whereas the downstream rolls, which can have the same speed, are cooled.

According to a further development of the invention it is provided that between the lateral edges of the tubular film web upstream and/or downstream of the rolls through which the web passes in a zigzag form, at least one sensing roll is arranged which can be brought into contact therewith. Said sensing roll which is preferably extendable by springs and which can be brought into contact with the tubular film web, measures the sag of the web, as the sensing roll extends corresponding to the sag and the measured degree of extension is a measurement for the sag. The measured sag is then used for the control of the method according to the invention, i.e. the heating and the subsequent cooling and/or the stretching of the web are coordinated with each other in such a manner that the sag and/or the different tensions along the width of the web are minimized.

One embodiment of the invention will now be described in the following with reference to the drawing.

DETAILED DESCRIPTION OF PREFERRED EMBODIMENT

Figure 1:
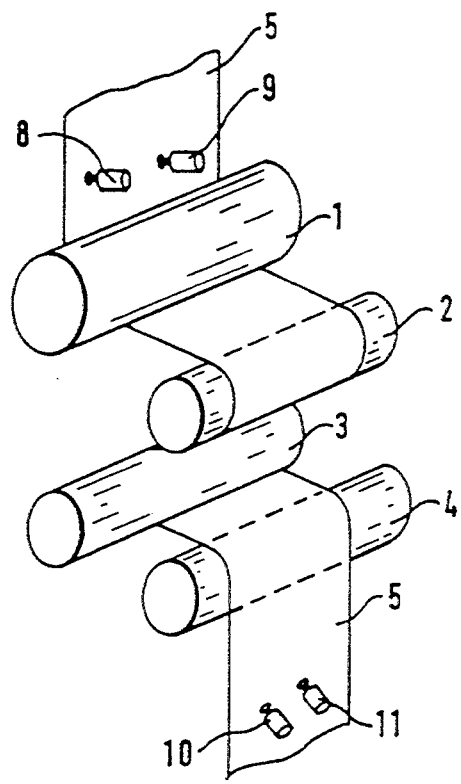
FIG. 1 shows four laterally staggered rolls arranged in planes being parallel to each other, over which the flattened tubular film web is passed in a zigzag form.

In FIG. 1 four rolls 1, 2, 3, 4 staggered with respect to each other are shown which are arranged in a frame (not shown) in planes being parallel to each other, over which the flattened tubular film web 5 produced by a blown film process is passed in the represented manner in a zigzag form. Of the rolls 1 through 4, the rolls 1 and 2 are heated in a known manner, whereas the rolls 3 and 4 are cooled in a known manner.

All rolls are provided with drives, wherein for the stretching of the web 5 the roll 2 is rotated at a higher speed than the roll 1 and the roll 3 in turn is rotated at a higher speed than the roll 2, whereas the rolls 3 and 4 do not show any difference in speed.

For the measuring of the sag of the web, the sensing rolls 8, 9 are in contact with the web 5 passing into the roll path, and the sensing rolls 10, 11 are in contact with the web leaving the roll path, said sensing rolls measuring the sag as a distance starting from a zero plane which is drawn through the lateral edges of the web. Therein, the sensing rolls 8, 9 measure the actual value of the sag, i.e. the sag starting from the zero plane, whereas the sensing rolls 10, 11 detect the reduced sag obtained due to the control.

Figure 2:
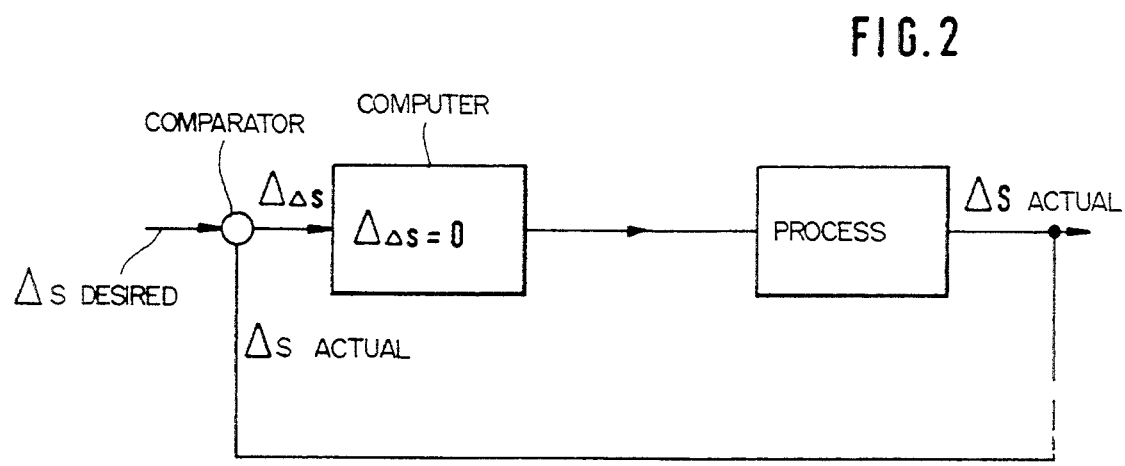
FIG. 2 is a schematic representation of the control circuit.

In FIG. 2 there is represented the control circuit. The control is carried out until the value ds reaches a minimum.

The sensing rolls can be spring-loaded pistons with the piston rods thereof carrying the sensing rolls at their ends.

It is evident from FIG. 2 that the actual amount of sag measured by the sensors 10, 11 is fed back to a comparator where it is compared with a desired amount of sag. The difference between these values namely $\Delta$ s is fed to a computer which produces relevant control signals for the heating/cooling/stretching process in order to reduce $\Delta$ s to zero.

We claim:

1. A method for the reduction of sag in a flattened web of tubular film produced by a blown film process comprising moving the film lengthwise and during movement of the film measuring the sag transversely across the film, passing the film through a heating zone and a cooling zone and using measurements of the sag for controlling heating and cooling of the film in said zones to reduce the sag.

2. A method as claimed in claim 1 wherein the sag is measured both before and after passage of the film through said zones.

3. A method for the reduction of sag in a flattened web of tubular film produced by a blown film process comprising moving the film lengthwise and during movement of the film measuring the sag transversely across the film, passing the film through a heating zone and a stretching zone and using measurements of the sag for controlling heating and stretching of the film in said zones to reduce the sag.

4. A method as claimed in claim 3 wherein the sag is measured both before and after passage of the film through said zones.

5. Apparatus for the reduction of sag in a flattened web of tubular film produced by a blown film process comprising at least two rolls over which the film is driven in a lengthwise direction one of said rolls being heated and another of said rolls being cooled, measuring means for measuring the sag transversely across the film and control means for heating and cooling the respective rolls dependent on measurements of the sag to reduce the sag accordingly.

6. Apparatus as claimed in claim 5 wherein the measuring means comprises transversely spaced sensing rollers.

7. Apparatus as claimed in claim 5 wherein the measuring means comprises first measuring means for measuring the sag prior to passage of the film over said rolls and second measuring means for measuring the sag after passage of the film over said rolls.

8. Apparatus for the reduction of sag in a flattened web of tubular film produced by a blown film process comprising at least two rolls over which the film is driven in a lengthwise direction, one of said rolls being heated and the rolls being driveable at different speeds respectively to stretch the film, and control means for heating said one roll and driving the rolls at different speeds dependent on measurements of the sag to reduce the sag according.

9. Apparatus as claimed in claim 8 wherein the measuring means comprises transversely spaced sensing rollers.

10. Apparatus as claimed in claim 8 wherein the measuring means comprises first measuring means for measuring the sag prior to passage of the film over said rolls and second measuring means for measuring the sag after passage of the film over said rolls.

11. Apparatus as claimed in claim 8 wherein another one of the rolls is heated and heating of said another roll is also controlled to reduce the sag.

* * * * *